(12) United States Patent
Prokop et al.

(10) Patent No.: US 10,859,720 B2
(45) Date of Patent: Dec. 8, 2020

(54) OPTO-MECHANICAL SENSOR SYSTEM FOR MEASURING SEISMIC MOVEMENTS AND A METHOD OF SEISMIC MEASUREMENTS USING THE SYSTEM

(71) Applicants: UNIVERZITA KARLOVA, Prague (CZ); Ústav Struktury A Mechaniky Hornin AV ČR, VVI, Prague (CZ)

(72) Inventors: Brokešová Johana Prokop, Prague (CZ); Jirí Málek, Prague (CZ)

(73) Assignee: UNIVERZITA KARLOVA & ÚSTAV STRUKTURY A MECHANIKY HORNIN AV CR, VVI, Prague (CZ)

( * ) Notice: Subject to any disclaimer, the term of this patent is extended or adjusted under 35 U.S.C. 154(b) by 327 days.

(21) Appl. No.: 16/067,443

(22) PCT Filed: Dec. 16, 2016

(86) PCT No.: PCT/CZ2016/000131
§ 371 (c)(1),
(2) Date: Jun. 29, 2018

(87) PCT Pub. No.: WO2017/114517
PCT Pub. Date: Jul. 6, 2017

(65) Prior Publication Data
US 2019/0049606 A1    Feb. 14, 2019

(30) Foreign Application Priority Data

Dec. 31, 2015    (CZ) .................................. 2015 960

(51) Int. Cl.
*G01V 1/18*    (2006.01)
*G01N 25/16*    (2006.01)
(Continued)

(52) U.S. Cl.
CPC .............. *G01V 1/189* (2013.01); *G01N 25/16* (2013.01); *G01V 1/162* (2013.01); *G01V 1/02* (2013.01);
(Continued)

(58) Field of Classification Search
CPC .......... G01V 1/189; G01V 1/162; G01V 1/02; G01V 13/00; G01V 1/166; G01V 2200/14; G01V 1/181; G01N 25/16
See application file for complete search history.

(56) References Cited

U.S. PATENT DOCUMENTS

| 9,753,167 B2 | 9/2017 | Edme et al. |
| 2014/0022861 A1 | 1/2014 | Edme et al. |
| 2019/0049606 A1* | 2/2019 | Prokop .................. G01V 1/189 |

FOREIGN PATENT DOCUMENTS

| CZ | 301217 B6 | 11/2009 |
| CZ | 301218 B6 | 11/2009 |

(Continued)

OTHER PUBLICATIONS

International Search Report dated May 12, 2017 cited in Application No. PCT/CZ2016/000131, 12 pgs.
(Continued)

*Primary Examiner* — Daniel Pihulic
(74) *Attorney, Agent, or Firm* — Bekiares Eliezer LLP

(57) ABSTRACT

The invention concerns a measuring instrument, a combined seismic sensor system that can measure 9 components of seismic motion, i.e. 3 orthogonal translational components, 3 components of rotation around orthogonal axes and 3 strain components at the measuring point. The system according to the invention comprises a solid undeformable frame, horizontal and vertical seismic sensors and optical dilatometers. The invention also includes a method of seismic measurement using the instrument. The instrument is (Continued)

suitable for measuring wavefields generated both by artificial sources (mine blasts, generators of rotational motions) and by natural sources (e.g. local earthquakes, rockbursts etc.)

12 Claims, 5 Drawing Sheets

(51) Int. Cl.
*G01V 1/16* (2006.01)
*G01V 1/02* (2006.01)
*G01V 13/00* (2006.01)

(52) U.S. Cl.
CPC .............. *G01V 1/166* (2013.01); *G01V 1/181* (2013.01); *G01V 13/00* (2013.01); *G01V 2200/14* (2013.01)

(56) References Cited

FOREIGN PATENT DOCUMENTS

| | | | | |
|---|---|---|---|---|
| CZ | 29353 | U1 * | 4/2016 | |
| CZ | 306566 | B6 * | 3/2017 | ............ G01V 1/162 |
| CZ | 2015960 | A3 * | 3/2017 | |
| EP | 3397994 | A1 * | 11/2018 | ............ G01V 1/162 |
| WO | 2010048906 | A2 | 5/2010 | |
| WO | 2017114517 | A1 | 7/2017 | |
| WO | WO-2017114517 | A1 * | 7/2017 | ............ G01V 1/189 |

OTHER PUBLICATIONS

International Preliminary Report on Patentability dated Jul. 3, 2018 cited in Application No. PCT/CZ2016/000131, 8 pgs.

Brokešoveáet al., "Rotaphone, a mechanical seismic sensor system for field rotation rate measurements and its in situ calibration", J. Seismol., vol. 16, No. 4, Springer Science+Business Media B.V., Feb. 24, 2012, 19 pgs., XP035106878, DOI 10.1007/s10950-012-9274-y.

Brokešováet al., "Rotaphone, a Self-Calibrated Six-Degree-of-Freedom Seismic Sensor and Its Strong-Motion Records", Seismological Research Letters, vol. 84, No. 5, Sep./Oct. 2013, pp. 737-744.

Lee et al., "Measuring rotational ground motions in seismological practice," Bormann, P. (ED.), New Manual of Seismological Observatory Practice 2 (NMSOP-2), Feb. 28, 2012, pp. 1-27, XP055363765, Retrieved from the Internet <URL:http://gfzpublic.gfz-potsdam.de/pubman/item/escidoc:43316:3/component/escidoc:56116/IS_5.3_rev1.pdf?mode=download> [retrieved on Apr. 11, 2017], DOI: 10.2312/GFZ.NMSOP-2_IS_5.3 *.

Velikoseltsev et al., "On the application of fiber optic gyroscopes for detection of seismic rotations", Journal of Seismology, Kluwer Academic Publishers, Springer Science+Busines Media B.V, DOI, vol. 16, No. 4, Feb. 18, 2012, pp. 623-637.

* cited by examiner

OPTO-MECHANICAL SENSOR SYSTEM FOR MEASURING SEISMIC MOVEMENTS AND A METHOD OF SEISMIC MEASUREMENTS USING THE SYSTEM

FIELD OF THE INVENTION

In general, the present invention concerns the area of seismic measurement. Specifically, it concerns a measuring instrument, a combined seismic sensor system able to measure 9 components of seismic motion, i.e. 3 orthogonal translational components, 3 rotational components around the orthogonal axes and 3 strain components at a given measurement point. The invention also includes the method of seismic measurement using this instrument. The instrument is suitable for measuring wave fields generated both by man-made sources (quarry blasts, a generator of rotational motions) and by natural sources (e.g. local earthquakes, rockbursts etc.).

BACKGROUND OF THE INVENTION

In principle, three types of ground motion can be measured in seismic measurements: the translational motion (displacement and derived quantities such as velocity and acceleration of such motion), rotational motion (rotation and derived quantities such as velocity and acceleration of such rotation) and strain motion (a change in the distance between two points and derived quantities such as velocity and acceleration of such change). Traditionally, seismic measurements have registered translational motions. While the translational component of ground motion is measured on a routine basis in seismology, the rotational component measurement has been developing only in the last roughly two decades (see, e.g., two special issues of scientific journals dedicated to rotational seismology: Bull. Seis. Soc. Am, Vol 99, No. 2B, 2009, special issue on Rotational Seismology and Engineering Applications, and J. Seismol, Vol 16, No. 4, 2012, special issue on Advances in Rotational Seismology: Action, Theory, Observations, and Engineering). It must be noted that the translational components are, to a certain extent, affected by the rotational motion and vice versa. Therefore, it is important to measure both types of motion accurately and simultaneously. There are several methods of measuring rotational seismic motions, known to date.

One of them are seismic arrays (e.g. Spudich, P., Steck, L. K., Hellweg, M., Fletcher, J. B., and Baker, M. (1995). Transient stresses at Parkfield, Calif., produced by the M 7.4 Landers earthquake of Jun. 28, 1992: Observations from the UPSAR dense seismograph array., J. Geophys. Res., 100 (B1):675-690) where the rotational motion is determined by approximation of space derivatives of the translational seismic motions measured by the particular seismographs in the array. A disadvantage is the relatively large minimum wavelength to which this method is applicable. Another disadvantage is the large area of the territory where the measuring is carried out, as the local inhomogeneities (the varying local conditions under each seismograph in the array) may reduce significantly the overall measurement accuracy. One more disadvantage is the necessity to install a higher number of seismographs (which should significantly exceed the theoretical minimum number of three), increasing the total costs of the measurement.

Another option of measuring seismic rotations are laser gyroscopes based on the so-called Sagnac effect and using the measurement of interference of two counter-propagating laser beams (see, e.g., Schreiber, K. U. et al., Ring Laser Gyroscopes as Rotation Sensors for Seismic Wave Studies, In: Earthquake Source Asymmetry, Structural Media and Rotation Effects, Teisseyre, R., Takeo, M., Majewski E. (Eds.), Springer, 2006). The gyroscopes provide very accurate measurements. Their disadvantage is that they are very costly and bound to one given place because they are bulky and must be mounted in specially adjusted conditions (special structures, underground spaces etc.). The gyroscopes measure rotational motion around one axis only.

For very strong ground motions, experiments are made with gyroscopes and tiltmeters used e.g. in aviation but without a clear application output so far. For weaker (more common) seismic motions, commercially accessible tri-axial rotational sensors operating on the electro-chemical principle can be used (Nigbor, R. L. (1994). Six-degree-of-freedom ground motion measurement, Bull. Seis. Soc. Am., Vol. 84, 1665-1669), but they are not universally applicable and they have shown a number of problems in tests (Nigbor, R. L., Evans, J. R., and Hutt, C. R. (2009). Laboratory and field testing of commercial rotational seismometers. Bull. Seismol. Soc. Am., 99(26):1215-1227).

Another option is a mechanical sensor system using geophones fixed in parallel pairs to a solid rigid frame according to patent CZ 301217. Various versions of this measuring system were used in a number of several-months-long up to several-years-long measuring campaigns around the world. Examples can be the active rift in the Corinthian Bay, Greece, the Great South-African Rift in Ethiopia, the induced seismicity area around the salt mine in Provadia, Bulgaria, the volcanic complex Katla-Eyafjalla in southern Iceland, the geothermal power plant The Geysers in California, etc. Those measurements have confirmed the existence of measurable rotational seismic motions excited by smaller earthquakes in close focal distances (see e.g. Brokešová J., Málek J., and Kolínský, P. (2012), Rotaphone, a mechanical seismic sensor system for field rotation rate measurements and its in-situ calibration, J. Seismol., Vol. 16, No. 4, 603-621, DOI: 10.1007/s10950-012-9274-y).

A great advantage of the above device is that both rotational and translational components are measured by the same device, i.e. with the same instrument characteristics, simplifying to a large degree the interpretation of the data obtained. A disadvantage of those seismic measurement instruments is that they measure maximum 6 components of seismic motion (they cannot measure strain), and furthermore, that the accuracy of measurement is reduced by the insufficient mutual calibration of the particular geophones. Both of those disadvantages are solved by the optomechanical seismic sensor system according to the present invention, described below.

Strain motion can be measured by so-called strainmeters or dilatometers. Of them, the one suitable for seismic purposes is such that uses the laser interferometry principle and is able to detect a change in distance, at ranges up to hundreds of meters (e.g., Agnew, D. C. and Wyatt, F. K., (2003), Long-Base Laser Strainmeters: A Review; Scripps Institution of Oceanography Technical Report). So far, those instruments have been used for measurements on low periods (days, months). In the field of higher frequencies, they are applicable up to several Hz at maximum. In seismic practice, mainly in mineral prospecting and in structural studies, the frequencies considered need to be several times higher (tens to hundreds of Hz). The seismic sensor system according to the invention allows that because thanks to the simultaneous and collocated measurement of strain, translational and rotational components the measured strains can be easily corrected (purified) from the impact of contamination by high-frequency translations and rotations of seismic origin.

So far, rotational seismic waves have been excited usually by typical seismic sources, natural earthquakes or anthropogenic sources, e.g. explosive blasts, various vibrators or drop testers. Those sources, however, transform only a certain (usually very small) part of energy to rotational components of seismic waves, the rest of the seismic energy is radiated in typical (translational) components of seismic waves. Patent CZ 301218 describes a generator of rotational waves, which is substantially more efficient in generating rotational ground motions. Moreover, it can repeatedly generate rotational motions with an identical source pulse. Such generator can be used, with an advantage, in combination with the sensor system according to the invention for a more accurate method of calibration of each sensor in the system. The method of seismic measurement using the optomechanical sensor system including calibration represents another aspect of the invention submitted.

SUMMARY OF THE INVENTION

An instrument according to the present invention is a device—an optomechanical sensor system for measuring seismic ground motion and ground strain (in total, nine components of ground motion) during the passage of seismic waves. The instrument combines two types of sensors—seismic sensors and optical dilatometers that complement each other. The central part of the sensor system comprises a solid rigid frame and sensors, or their parts, fixed to the frame. Corner reflectors that form a part of the dilatometers are not connected to the frame but form a peripheral part of the optomechanical system. During measurement, the instrument is placed at one spot on the Earth's surface and is firmly anchored to the ground, the motion and strain of which is measured. The corner reflectors are placed in suitable directions and distances from the central part and are also firmly attached to the ground. The system needs a power supply to operate, that can come from the power grid, batteries or from a local power generator (solar panels, a small wind turbine etc.).

The fundamental part of the central part of the system according to the present invention is the firm, rigid frame that can have various shapes, preferably circular for example, and is adapted to being firmly anchored to the ground, e.g. with spikes, or to a support that is firmly anchored to the ground. Seismic sensors and most parts of the dilatometers—laser sources, semi-permeable mirrors, light receiver and interferometer, are placed on the frame and firmly connected with it. Preferably, one joint laser source can be used, with a beam distributor for all dilatometers. Other parts of the dilatometers are the corner reflectors of laser beams that are not connected to the frame, and belong to the peripheral part of the system. For measuring, they are located in the field at a certain distance from the frame, and therefore they are also adapted to being firmly anchored to the ground. The dilatometers are used for measuring three strain components. For that they must be deployed so that they measure in preferably four different directions. The signal from the seismic sensors and dilatometers in an analogue form is advantageously conducted to a digitizer and then, in a digital form, further processed, e.g. saved in a computer memory. Persons skilled in the art are aware of other possibilities of transferring and processing the signals. The recorded signals are further processed by means of a special algorithm in a registration device, e.g. a computer, whereby the characteristics of the instrument according to the invention (sensitivity, frequency range, ease of measurement) are significantly improved against measurement carried out with devices known from the prior art. A specialized computer program product is also one aspect of the present invention.

The impulse response of the seismic sensors can slightly change during measurement due to a change in temperature, humidity or aging of the material of which the parts of the sensors are made. It is therefore necessary to calibrate the seismic sensors during a continuous measurement. The method of such calibration is based on the fact that the number of seismic sensors on the frame is higher than the number of the components measured. As the seismic sensors measure three translational components and three rotational components, the number of seismic sensors must be at least 8, of that 4 vertical, arranged in two parallel pairs, and 4 horizontal, also arranged in two parallel pairs. The calibration process seeks the impulse response parameters of the seismic sensors used, that can be considered constant in the short time interval. The waveforms of the seismic motion measured during this time interval are used as the measured data for this task. The method of measurement including this calibration process is another aspect of the present invention and is described in detail in a separate part below.

Advantageously, the seismic sensor system according to the invention can be used together with an anthropogenic source of rotational motion, e.g. a generator according to patent CZ 301218, which is able to generate identical source pulses transmitted to the ground. Such arrangement is intended for seismic prospecting purposes. Moreover, it enables another advantageous option of calibrating each sensor when the instrument turns by exactly defined angles against the source between two successive generator actions. The subsequent processing of data measured at such turns enables us to identify corrections of the impulse response of the particular sensors and so calibrate them mutually. That calibration method is described in more detail below and it also represents another aspect of the submitted invention. The corrections correspond to the state and physical conditions at the time when the given measuring and instrument turning were underway. In prospecting measurements, calibration can be carried out either exclusively using the method based on turning, or by combining it preferably with the calibration method mentioned in the paragraph above.

For measurements of seismic motion excited by a natural, i.e. unrepeatable source (e.g. earthquake, rockburst etc.), it is possible to apply a repeatable source and the turning method during the installation of the sensor system at the beginning of the measuring campaign and to use the corrections of impulse responses of the sensors, obtained this way, as input values for the calibration method mentioned in the previous paragraph.

The main advantage of the instrument and of the method according to the present invention is that all 9 components of seismic motion are measured jointly by a single device at one time and one measurement point. That provides an economic advantage over the devices used to date, i.e. a significantly increased cost effectiveness. As opposed to the instrument according to the patent CZ 301217, used to date, three additional components of strain are measured and the frequency range has been expanded too. The new method of processing the signal provides a higher accuracy of measurement.

The inclusion of two different kinds of calibration process improves the flexibility of the instrument so that it can be used both in prospecting seismology in combination with anthropogenic generation of seismic waves and in research of natural and induced seismicity.

Nine-component measurement allows us to decompose the real seismic wave field in the horizontal plane into three independent types of motion: translation, rotation of a rigid body and deformation of an elastic body, and that without contamination of ones by the others. The processing results, among other things, in determining the direction and velocity of propagation of the various types of longitudinal, transverse and surface waves. Thanks to measuring strain, the limitation of the instruments according to the state of the art has been overcome, as the parameters of longitudinal P waves cannot be effectively obtained from rotational components.

DETAILED DESCRIPTION OF THE INVENTION

First, the different parts of the instrument according to the present invention and their mutual arrangement will be described, and then the method of seismic measurement using the described instrument and the method of processing the signal will be described.

Optomechanical Sensor System for Measuring Seismic Ground Motion

The frame of the instrument is a solid rigid body adapted so that it can be easily attached to the ground motion of which is measured. Advantageously, it can have the shape of a disc or cylinder, for example. Typically, its dimensions are within decimeters to meters, usually within 1 m. Its weight enables easy transfer and manipulation and for that reason it is typically made of light metals (e.g. duralumin). It is possible to mount seismic sensors and dilatometers onto the frame. Those devices are deployed at various points on the frame.

Seismic sensors are mounted at various points on the frame and are of two types, vertical and horizontal, according to the seismic motion component they measure. The horizontal sensors have varying orientations so that it is possible to derive from them the waveform of two mutually perpendicular horizontal seismic components. The lowest number of sensors that need to be deployed on the frame for measuring three translational and three rotational components using a calibration based on the frame rigidity (see below) is 4 vertical sensors and 4 horizontal sensors. Nevertheless, it is advantageous to use a higher, even number of sensors that are arranged in parallel pairs.

The seismic sensors may be constructed in various ways, we assume the use of standard sensors known to professionals and commercially available. It is possible to use seismic velocity sensors, e.g. geophones, or acceleration sensors, accelerographs. The sensors must have sufficient sensitivity (at least in the order of $\mu m/s$ or $\mu m/s^2$) in the frequency range that is the subject of measurement, low noise (up to 1 promille of the measured signal) allowing for the relatively demanding subsequent processing of the signal and a very low sensitivity to vibrations in the components that are perpendicular to the measured component (e.g. vertical sensors must not be sensitive to horizontal vibrations more than in the order of 1%). For good functioning of the instrument it is advantageous if all the seismic sensors used are of the same type but it is not necessary.

Optical dilatometers are based on interference of two coherent laser light beams, obtained by decomposition on a semi-permeable mirror, and comprise a laser source, interferometer and a corner reflector as its basic parts. All components of the optical dilatometers, except for corner reflectors, are attached to the solid frame. One beam propagates to the corner reflector that is placed at a certain distance from the frame during measurement and is, same as the frame, firmly attached to the ground. After reflecting from the corner reflector, the beam propagates back and here it interferes with the second reference beam that propagates only within the solid frame. The change of the interference stripes is proportional to the derivative of the distance between the frame and the corner reflector and therefore also to the derivative of the ground strain in this direction. The principle of this measurement is generally known to professionals and has been used for several decades. The accuracy of such measurement is given by the wavelength of the laser used and by the distance from the corner reflector. A shift of the interference image by one stripe corresponds to a change in the distance by half of the wavelength.

Interferometer is an instrument known in the scientific field, it usually comprise a reflection mirror, semi-permeable mirror and a detector.

In order to reconstruct the time derivative of the horizontal ground strain, at least four measurements are necessary of the distances in different directions, i.e. at least 4 dilatometers must be attached to the frame (the laser source may be advantageously one, shared). The instrument according to the submitted invention, however, uses advantageously a higher number of directions for measurements of the distances, which are then combined with seismic measurements, and that increases their accuracy. The source of light is advantageously a single laser module that is divided by a system of semi-permeable mirrors, a so-called distributor, into several beams propagating in various directions.

Corner reflectors are used by default to ensure that the laser beam reflects in a direction opposite to the direction in which it came to the corner reflector. In measurements using the instrument according to the invention, the corner reflectors are deployed in various directions from the frame and must be firmly attached to the ground. Another important condition is that the frame must be directly visible from the reflector.

The optomechanical sensor system according to the present invention therefore comprises a central part comprising the frame with all the elements attached to it and a peripheral part comprising the elements not attached to the frame, i.e. mainly the corner reflectors.

Registration device comprises a digitizer and the actual registration device, advantageously a computer. Signals from the seismic sensors are analogue and therefore they must be digitalized by using an A/D convertor. Changes in the interferometer stripes can be registered by means of digital inputs so that the dark stripe represents 0 and the light stripe 1. The measurement is saved in the registration device, e.g. advantageously in the computer memory and then the data can be processed.

For a full-fledged measurement, i.e. measurement of all 9 components, using the calibration based on the frame rigidity, the following minimum numbers of parts and their arrangement in the instrument according to the submitted invention are necessary:

Four horizontal sensors are located on the frame so that the connecting line between their center and the gravity center of the frame is perpendicular to the direction in which the sensor is measuring, and are arranged in two pairs so that within one pair the sensor axes are parallel and at the same time the directions perpendicular to the sensor axes in both pairs are not identical. Advantageously, they are located at an angle that is not explicitly small; at best the angle between them is 90°.

Four vertical sensors arranged in two pairs so that the connecting lines of the sensors in both pairs form an angle that is not advantageously explicitly small, at best the angle between them is identical with the angle between the horizontal sensors, i.e. 90°.

Four dilatometers, generally in any 4 different directions that are not similar to one another and not opposing each other so that they, if possible, cover "azimuthally" the whole circle; they do not have to be distributed evenly and they do not need to be identical with the directions of the mechanical sensor pairs.

Method of Processing the Measurements

The fundamental relationship forming the basis for processing the measured signals is Taylor expansion of seismic velocity $u_i$ according to the three-dimensional coordinates $x_j$ at the origin of coordinates that is placed at the gravity center of the instrument frame. Approximately, it holds that:

$$u_i(x) \cong u_i(0) + \sum_{j=1}^{3} u_{i,j}(0)x_j \quad i = 1, 2, 3 \quad (1)$$

Where $u_{i,j}$ marks the derivative of the i-th component of velocity $u_i$ according to three-dimensional coordinate $x_j$. As the measurement is carried out on the horizontal plane on the Earth's surface, $x_3=0$ and index j in (1) has only values 1 and 2.

When processing signals from seismic sensors, it is necessary to consider the frequency characteristics of the sensors and to determine the real motion at the location of the sensor. That is typically possible only in a certain frequency range which depends on the sensor type used. First, the seismograms are therefore filtered through the relevant band filter. The real motions are determined by deconvolution of the measured signal with the impulse response of the sensor. The impulse responses are obtained through the calibration by means of turning the instrument during the registration of repeated identical pulses generated by a special device (e.g. the device according to patent CZ 301218). The impulse responses are then determined more accurately based on a calibration that is carried out constantly during the measurement and that is enabled by the fact that the instrument has more seismic sensors for measurement than there are quantities measured. That method of calibration is described in more detail in a separate part below. The result is the finding of 3 translational components $u_i(0)$ and 3 rotational components $r_i(0)$ in the center of the frame, which are determined by the relations:

$r_1(0) = \frac{1}{2}(u_{2,3} - u_{3,2})$ $r_2(0) = \frac{1}{2}(u_{3,1} - u_{1,3})$ $r_3(0) = \frac{1}{2}(u_{1,2} - u_{2,1})$ (2)

Then the distance measured by the dilatometers is used. In this case, the frequency characteristics does not need to be corrected. For the measurement to be compatible with the measurement by means of seismic sensors, the same band filter is used.

Let d be the distance between the center of the frame and the corner reflector, and $d_0$ the distance in the undeformed state. That distance is determined when the instrument is installed, considering the expected range of wavelengths of the registered seismic waves, so that it is significantly shorter than the shortest wavelength, but at the same time is not negligible with regard to the wavelength. It results from formula (1) that:

$$d^2 - d_0^2 = \sum_{i=1}^{2} \sum_{j=1}^{2} (u_{i,j}(0)x_j)^2 \quad (3)$$

If distance is measured in k different directions, then we obtain k equations of type (3) that can be used for the calculation.

Now, the systems of equations (2) and (3) are numerically solved together and so the components of tensor $u_{i,j}$ can be found. However, components $u_{i,3}$ cannot be found because they do not appear in any of the equations. That is due to the fact that measurement is carried out only on the horizontal plane and therefore depth derivative $u_i$ cannot be determined because measurements are made only on the Earth's surface. In total, using this method we will determine 3 translational components and 6 components of the tensor of the first derivatives, i.e. 9 quantities. On the Earth's surface, $u_{1,3} = u_{3,1}$ and $u_{2,3} = u_{3,2}$.

The interference measurement itself will only determine the absolute value of change in the distance between the relevant corner reflector and the frame's gravity center, but not whether the distance has increased or decreased. Nevertheless, that information can be easily obtained by analyzing the translational components measured simultaneously with the strain components.

The Method of Calibrating Each Sensor

The primary outputs of the seismic sensors are signals from n vertical and m horizontal sensors, e.g. geophones. The sensor outputs do not represent the real ground motion, however, because they are influenced by the frequency characteristics of the sensors. The goal is to measure the real ground motion in a certain frequency band. For that reason, the signals from the sensors are filtered with a band filter and are corrected with regard to the frequency characteristics. It is suitable to use seismic sensors of the same kind. But even in that case the frequency characteristics of the sensors may differ approximately in the order of percents.

As the rotational components, in particular, are usually very small quantities, such difference in the characteristics of the various sensors may represent a serious problem. The purpose of the calibration is therefore to determine as accurately as possible the corrections of the frequency characteristics of each sensor in relation to one reference sensor in the system. In such case, the calibration is an integral part of the measurement method.

Another aspect of the invention is the method of calibrating the instrument according to the present invention. The calibration can be carried out in two ways: (i) by using the turning of the central part of the system, or of its rigid frame (mainly at the beginning of the measurement), and (ii) by using the rigidity of the frame, i.e. the fact that different pairs of sensors should, thanks to the frame rigidity, provide the same waveforms of the rotational components.

Calibration Using the Frame Turning

This method uses the seismic wave source that generates identical pulses repeatedly. Another condition is the deployment of seismic sensors on the frame so that when turning by a certain angle smaller than or equal to 180°, the same geometrical arrangement of sensors is obtained. The procedure when applying this method is as follows. The frame is placed on a rigid support that is equipped with fixation elements, e.g. dents, and firmly attached to the ground. The complementary fixation elements on the frame, e.g. protuberances, are coupled to the fixation elements on the support, i.e. the protuberances fall in the dents.

The repeatable source is placed within a suitable distance from the instrument and at least one, preferably higher number of source pulses are excited. Then the frame turns against the support by a defined angle so that again the relevant fixation elements are joined and at the same time the same configuration of the sensor system against the location of the source is achieved (only the sensors have moved to the next position in their sequence in the system). Then again at least one, preferably more source pulses are excited. The whole procedure is repeated, whereby the sensors move along a circle path until they get back to their starting position.

An arithmetic average of the measured rotations in all positions and for all source pulses will yield the correct rotation corresponding to the given constantly repeating source signal. In parallel with that, the characteristics of each sensor are corrected so that they provide this correct rotation at each position during the turning.

Calibration In Situ, Exploiting the Frame Rigidity

The characteristics of each sensor are clearly given either by the complex frequency characteristics (within the frequency area) or by the impulse response of the sensor in the time area. When processing seismic signal in the instrument according to the submitted invention, representation by means of impulse response is advantageously used.

In a preferred embodiment of the invention, the seismic sensors are geophones. But it is possible to use other types of seismic sensors too. For the sake of simplicity, only the calibration of geophones will be described below.

Geophone is a damped oscillator whose oscillation velocity response to an impulse of the ground motion velocity is given by three parameters, sensitivity A, the natural frequency $\omega$ and the damping factor b. It is assumed that geophones have subcritical dumping. Then the impulse response for t>0 can be approximated with the relationship $$I(t)=Ae^{-bt}\sin(\omega t),$$

An example of such impulse response is in FIG. 5. Parameters A, $\omega$, b are close to the values $A_0$, $\omega_0$, $b_0$ that were found in calibration, e.g. at the start of the measurement using the turning of the instrument frame, or they correspond to the values specified by the producer. However, those parameters may slowly change due to temperature and pressure changes, or due to material aging.

As two types of geophones are used (vertical and horizontal), the task of determining 3 translational and 3 rotational components can be divided into two independent sub-tasks:
(1) to determine one translational component (vertical Z) and two rotational components (tilts) from the vertical geophones, with their parallel calibration.
(2) to determine two translational components (horizontal N-S and E-W) and one rotational component (torsion) from the horizontal geophones, with their parallel calibration.

The solution of the first sub-task:

The signal recorded by the vertical geophones V(t) is first filtered with the band filter in the required frequency interval. In the first approximation, the geophones have parameters $A_0$, $\omega_0$, $b_0$. Deconvolution is made for all vertical geophones and the oscillation velocity waveform is obtained:

$$v(t)=V(t)\otimes A_0 e^{-b_0 t}\sin(\omega_0 t),$$

where symbol $\otimes$ denotes deconvolution and v(t) is the real ground motion. If the calibration is accurate, then the waveform of the vertical translation component at the gravity centers of geohpones $\bar{v}_3(t)$ is determined as:

$$\bar{v}_3(t) = \frac{\sum_{i=1}^{n} v^i(t)}{n}.$$

The rotational components $r_1(t)$, $r_2(t)$ are determined by solving the system of equations $$v^i(t)=\bar{v}_3(t)+r_2(t)x_1^i+r_1(t)x_2^i \qquad (4)$$

Where $x_1^i$, $x_2^i$ are the coordinates of the i-th sensor (the origin of the coordinates is in the gravity center).

As there are at least 4 sensors, this system is overdetermined. The optimal solution can be found through the Newton method. Then the residues can be calculated, i.e. the difference between the given and the calculated values $v^i(t)$ in system (4). If the calibration is correct, then all residues are zero.

This calculation can be understood as the residues in system (4) being a function of the calibration parameters of the geophones. If the calibration parameters A, $\omega$, b are correct, then the residues are zero. These parameters are, moreover, identical for every time t during the measurement interval. If there are k points in the seismograms, then there are kn equations for 3n calibration parameters. Another binding condition is that the resulting parameters should not vary too much from the starting parameters $A_0$, $\omega_0$, $b_0$. This type of tasks is solved by means of numerical methods based on the theory of inverse problems. One of the advantageous methods that can be used is the isometric method (Málek, J., Růžek, B., and Kolář, P. (2007). Isometric method: Efficient tool for solving non-linear inverse problems. Stud. Geophys. Geod., 51:469-490.).

A similar procedure is used for solving the second sub-task for the horizontal geophones:

The horizontal geophones are placed on the frame so that the connecting line between their centers and the gravity center is perpendicular to the direction in which the geophones are measuring. The recorded signal from the horizontal geophones H(t) is first filtered with the band filter in the required frequency interval. Again, in the first approximation the geophone parameters are $A_0$, $\omega_0$, $b_0$. Deconvolution is made for all horizontal geophones and the oscillation velocity waveform is obtained:

$$h(t)=H(t)\otimes A_0 e^{-b_0 t}\sin(\omega_0 t).$$

If the calibration is accurate, the waveform of the horizontal translational components $\bar{v}_1(t)$ and $\bar{v}_2(t)$ at the gravity center of the geophones is determined by:

$$\bar{v}_1(t) = \frac{\sum_{i=1}^{m} h^i(t)\cos(\phi^i)}{\sum_{i=1}^{n} \cos(\phi^i)},$$

$$\bar{v}_2(t) = \frac{\sum_{i=1}^{m} h^i(t)\sin(\phi^i)}{\sum_{i=1}^{n} \sin(\phi^i)},$$

where i is the geophone index and $\phi^i$ is the angle between i-th geophone and axis $x_1$.

Then the amplitude of the horizontal component is determined at the point of the sensor provided that the rotational component $r_3(t)$ is zero:

$$\bar{h}^i(t)=\bar{v}_1(t)\cos(\phi^i)+\bar{v}_2(t)\sin(\phi^i).$$

The rotational component $r_3(t)$ is then determined from the system of equations $$h^i(t)=\overline{h}^i(t)+r_3(t)\rho_i, \qquad (5)$$

Where $\rho_i=\sqrt{(x_1^i)^2+(x_2^i)^2}$ is the distance between the sensor center and the gravity centre.

The residues, i.e. the difference between the measured and calculated values $h^i(t)$ in system (5) are calculated. If the calibration is correct, all residues are zero.

Same as in the case of vertical geophones, the residues in system (5) are a function of the calibration parameters of the geophones. If the calibration parameters A, ω, b are correct, the residues are zero for every time t. It is further required that the resulting parameters do not differ too much from the starting parameters $A_0$, $\omega_0$, $b_0$. This task is again solved by means of numeric methods based on the theory of inverse problems.

The method of measurement including at least the steps of the above calibration method, preferably of both calibration methods, can be advantageously implemented with the help of a computer program. A computer program product that comprises at least some steps from the above methods of measurement and calibration is also an aspect of the present invention.

EXAMPLES OF THE INVENTION

Example 1

Optomechanical Sensor System for Measuring Seismic Ground Motion

Figure 1:
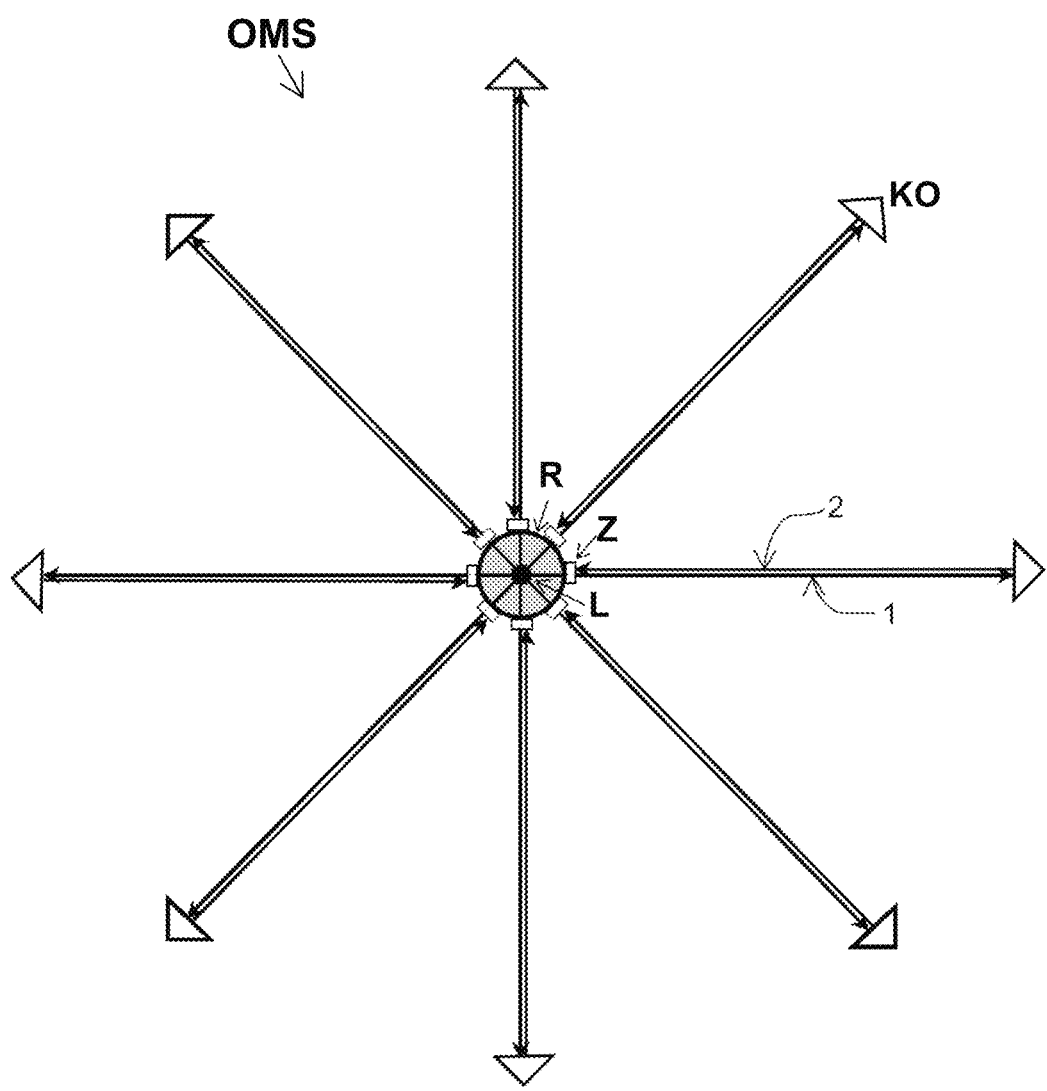
FIG. 1: A diagram of a preferred embodiment of the nine-component optomechanical sensor system for measuring seismic ground motion where the central part of the system comprises a frame, a laser, interferometers and seismic sensors (not shown) and the peripheral part, not connected to the frame, comprise corner reflectors.
Figure 2:
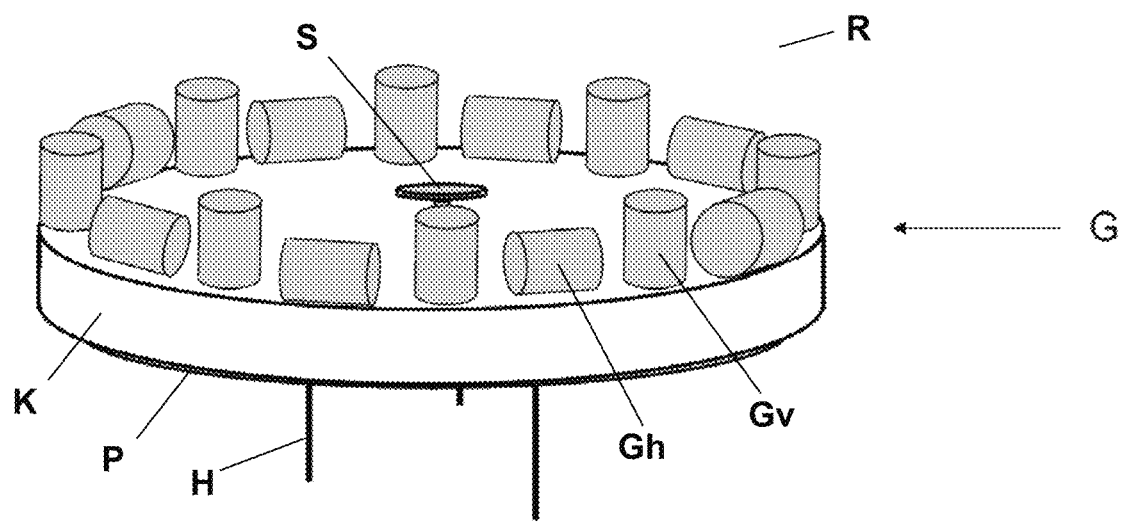
FIG. 2: A diagram of a preferred embodiment of the central part of the nine-component optomechanical sensor system for measuring seismic ground motion. For calibration, the central part is placed on a support equipped with spikes for a firm attachment to the ground and the frame is firmly but disconnectably connected to the support. The central part of the system comprises, apart from seismic sensors, also a laser and interferometers (not shown).

A preferred embodiment of the device according to the present invention, the optomechanical seismic sensor system OMS, which can measure 9 degrees of freedom of seismic motion, is schematically drawn in FIG. 1 and FIG. 2. The system comprises a central part R and a peripheral part KO. The central part R comprises a solid rigid (undeformable) frame K, a laser source L (TTL blue 1000 mW 445 nm, ECLIPSERA s.r.o., Czech Republic) with a beam distributor, eight horizontal sensors Gh and eight vertical sensors Gv (geophones SM-6, 3500 Ohm, ION GX Technology, the Netherlands) which are arranged in parallel pairs along the perimeter of the circular rigid frame K at the vertices of a regular octagon.

Moreover, the frame K carries eight laser interferometers Z (10715A Differential Interferometer, Keysight Technologies, USA) for measuring the change in the distance between frame K and the relevant eight corner reflectors KO (CCP-15B-2, Lambda Research Optics Inc., USA). The corner reflectors KO are included in the peripheral part of the OMS system and are anchored to the ground during measurement. The frame K of the central part R has the shape of a disc with a 44.5 cm diameter and 5 cm thickness and is made of duralumin including the holders holding geophones Gh, Gv. The holders have the shape of a cylindrical sleeve.

Laser source L with the beam distributor distributes the beams into eight directions at 45° angles. FIG. 1 also shows beam 1 going from the source towards corner reflector KO and beam 2 reflected from corner reflector KO going back to the interferometer Z.

A detail of an embodiment of interferometer Z is shown in FIG. 2. The laser beam is divided on the semi-permeable mirror PZ to two beams. The first gets reflected from mirror OZ that is attached to frame K. The second gets reflected from corner reflector KO which is attached to the ground during measurement and therefore moves together with the ground. The interference of both beams creates interference stripes in a detector D. The motion of the stripes depends on the motion of corner reflector KO. The principle of how those stripes are created and their interpretation for measuring distance is known in the state of the art.

Furthermore, system OMS preferably comprise a 24-bit digitizer (not shown in the figure, Embedded Electronics & Solutions, Ltd., Czech Republic) which is also attached to central part R, or its frame K. Data are transferred from the digitizer to registration computer CPU Intel Atom Dual Core N2600 (Embedded Electronics & Solutions, Ltd., Czech Republic) by means of a USB cable that serves, at the same time, as a power supply for the whole of part R.

Figure 3:
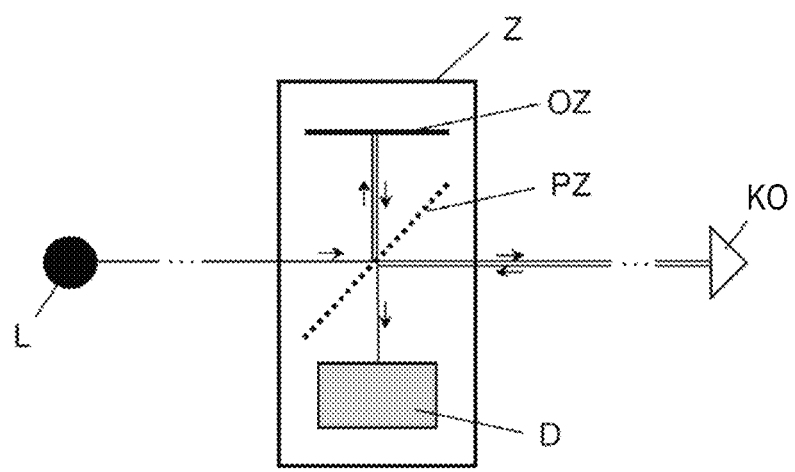
FIG. 3: A diagram of an advantageous arrangement of the dilatometer with the laser, interferometer and corner reflector where the interferometer comprises a reflecting mirror, semi-permeable mirror and a detector.
Figure 4:
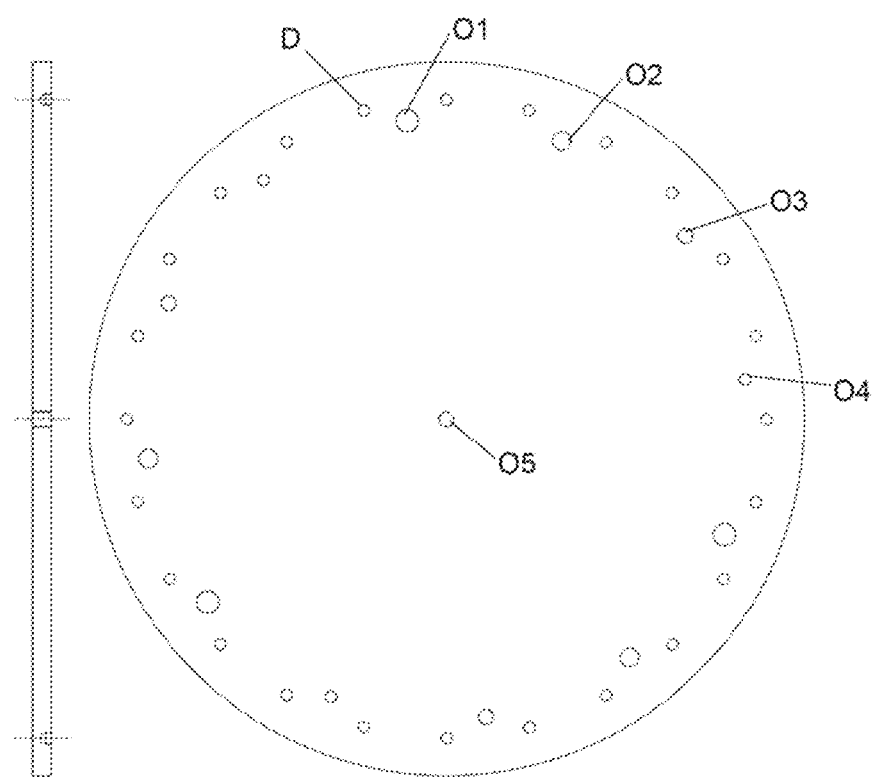
FIG. 4: A diagram of an advantageous version of the solid support enabling the revolution of the central part of the system, or its rigid frame, by a precisely defined angle (here specifically by 15°) for calibrating each sensor, using a repeatable source exciting identical source pulses.

For calibration, and for the actual measurement where applicable, the central part R is placed on a solid support P. An advantageous version of such rigid support P is shown in FIG. 4. The support P in the shape of a circular plate with a 40 cm radius is made of duralumin with pre-bored holes O1, O2, O3 and O4 and dents D enabling the turning of rigid frame K by a precisely defined angle (here specifically 15°), which is used in calibrating sensors Gv and Gh by means of a repeatable source exciting identical source pulses. Dents D are located near the outer edge of the support. Bores O1, O2, O3 and O4 have varying diameters and their sequence is regularly repeated three times along the perimeter of the circular support P. This arrangement is advantageous thanks to the use of three spikes H (see FIG. 3) with a regular angular spacing at 60° in relation to the center of support P, intended for fixing support P to the ground, the floor etc. with through spikes of different thickness, suitable for different materials under support P. In the center of support P there is bore O5 for a screw-bolt S (see FIG. 3) used for fixing rigid frame K to support P.

Example 2

Measurement with a Calibration of the Instrument

The method of calibrating system OMS described in Example 1, by means of turning central part R while identical seismic pulses are repeatedly generated from a special device (advantageously the generator of rotational seismic pulses according to patent CZ 301218) is demonstrated in FIG. 4. During the calibration, each of the vertical geophones Gv and horizontal geophones Gh passes through eight positions.

As shown in FIG. 4, vertical sensor Gv and horizontal sensor Gh (marked with a darker color in FIG. 3) travel the whole circle against the fixed position of the source during the gradual turning by a 45° angle through the eight positions. An arrow G indicates the invariable direction from the source of repeatable seismic pulses located in a stable position.

The sum of all measurements produces eight seismograms that are equivalent to a measurement with identical sensors with average frequency characteristics. A comparison with the individual measurements then yields the frequency characteristics of the particular geophones Gv and Gh.

Figure 5:
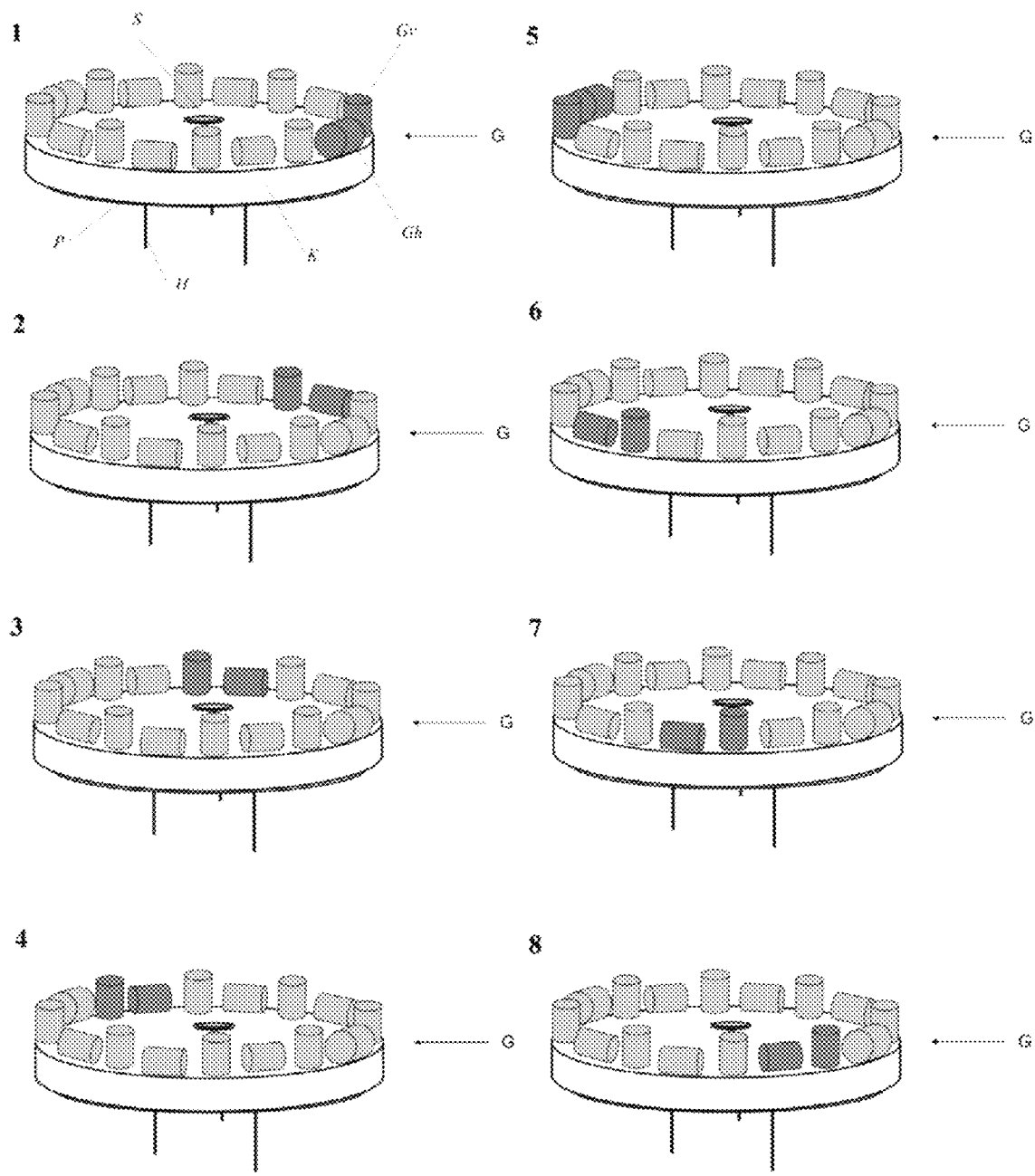
FIG. 5: A diagram of an advantageous method of calibration by means of turning the rigid frame of the central part of the system, using a repeatable source of seismic pulses placed at a stable location.

Such measurement requires support P that ensures a precise turning of central part R of system OMS. An advantageous version of the support was described in Example 1 and is shown in FIG. 5. Support P has dents D along its perimeter spaced at 15° angles, and protuberances on the bottom side of frame K fall in them during the turning. Frame K turns by 45°, i.e. by 3 dents. Support P is attached to the ground by means of spikes H, e.g. special soil screws. Frame K is fixed to support P with bolt S screwed through bore O5. An example of an impulse response of a geophone, representing calibration for a specific geophone Gv, Gh is shown in FIG. 6.

The geophone behaves as a damped oscillator with subcritical damping, whose oscillation velocity response to an impulse of the ground motion velocity is given by three parameters for t>0, i.e. sensitivity A, natural frequency ω and damping factor b $$I(t)=Ae^{-bt}\sin(\omega t)$$

Figure 6:
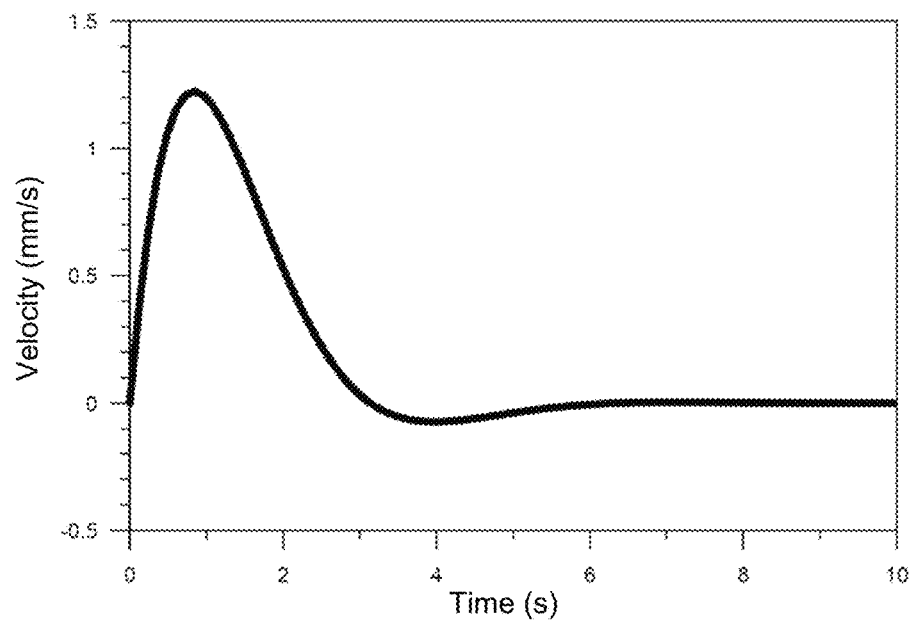
FIG. 6: Example of an impulse response of a sensor in the mechanical part of the sensor system.

FIG. 6 demonstrates the waveform of the time dependence of the impulse response of a geophone with parameters A=3.5 mm/s, ω=1 rad/s, b=0.9, which can be subsequently used in the method of calibrating the sensors with the use of the frame rigidity. The measured impulse responses are then the starting model for calibration in situ during the instrument R operation.

Signals from geophones Gv, Gh are transferred by a shielded cable to the 24-bit digitizer (which is also advantageously attached to frame K). The data are transferred from the digitizer to the registration computer by a USB cable which also provides power supply to the whole of central part R of system OMS.

Figure 7:
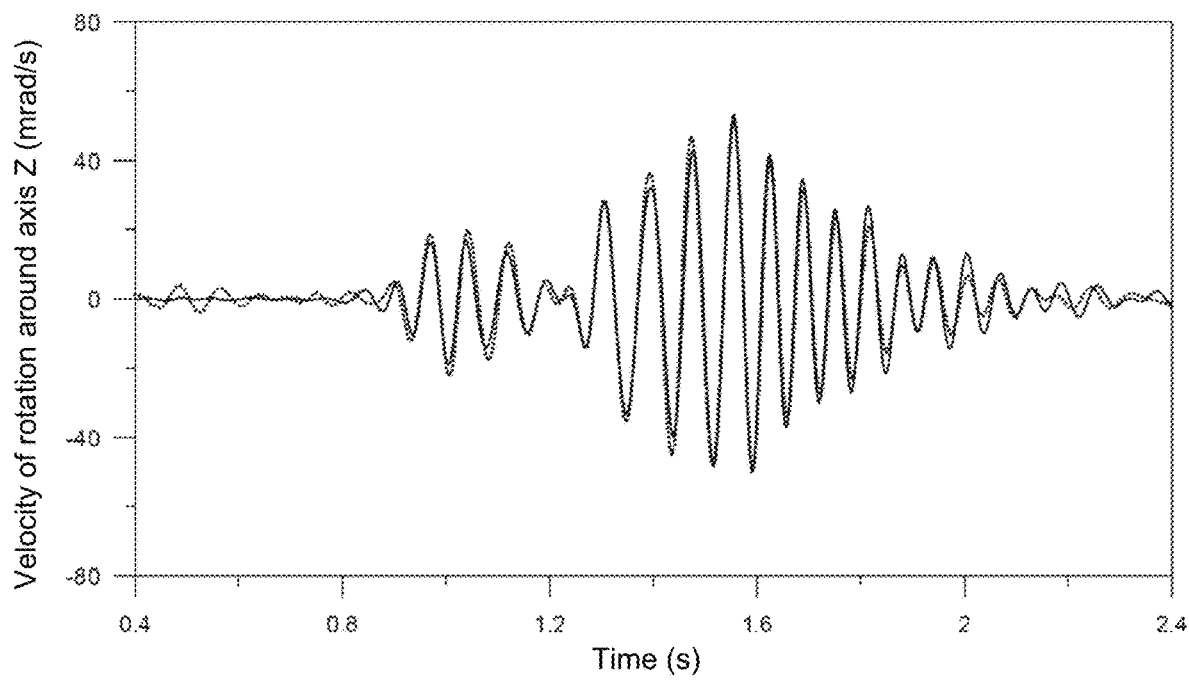
FIG. 7: Comparison of two calibration methods: a method using a repeatable source and revolution of the rigid frame against the support (dotted line) and a method using the rigidity of the instrument frame (continuous line).

After the calibration described above, measuring system OMS was ready for measurement. Test measurements were carried out successfully. An example of a comparison of rotational seismograms that were obtained when using both calibration methods is shown in FIG. 7. The dotted line indicates the waveform of the velocity of ground rotation around the vertical axis, obtained in calibration by the method using the repeatable source and the turning of the rigid frame K against the support P, firmly anchored to the ground, and the solid line indicates the same waveform but obtained in the calibration method using the rigidity of the frame K of the central part R of the system OMS.

The invention claimed is:

1. An optomechanical seismic sensor system (OMS) comprising a rigid undeformable frame (K), at least four horizontal seismic sensors (Gh) configured to measure horizontal seismic motions with respect to the Earth's surface, at least four vertical seismic sensors (Gv) configured to measure vertical seismic motions with respect to the Earth's surface, firmly attached to the frame (K), and at least four optical dilatometers, comprising at least one laser source (L), at least four laser interferometers (Z) and at least four corner reflectors (KO), wherein at least one laser source (L) and the laser interferometers (Z) are firmly attached to the rigid frame (K), which forms, together with all elements (Gh, Gv, L, Z) firmly attached to it, the central part (R) of sensor system (OMS), and wherein the corner reflectors (KO) are not connected to the frame (K) and form the peripheral part of sensor system (OMS), and the horizontal sensors (Gh) are arranged in parallel pairs along the perimeter of the frame (K) so that axes of the two horizontal sensors (Gh) in one pair are parallel and at the same time the directions perpendicular to the axes of horizontal sensors (Gh) in different pairs are not identical to each other and form an angle, and the vertical sensors (Gv) are placed along the perimeter of the frame (K) and are arranged in pairs so that the lines connecting vertical sensors (Gv) in different pairs form an angle, and the dilatometers are arranged for measurement in any mutually different directions.

2. The optomechanical seismic sensor system (OMS) according to claim 1, wherein a central part (R) that comprises eight horizontal sensors (Gh), eight vertical sensors (Gv), eight interferometers (Z) and one common laser source (L) equipped with a distributor, a peripheral part comprising eight corner reflectors (KO), wherein sensors (Gh, Gv) and interferometers (Z) are placed along the perimeter of the disc-shaped rigid frame (K) at the vertices of a regular octagon.

3. The optomechanical seismic sensor system (OMS) according to claim 1, wherein all sensors (Gh, Gv) are geophones of the same type.

4. The optomechanical seismic sensor system (OMS) according to claim 1, wherein all sensors (Gh, Gv) are accelerometers of the same type.

5. The optomechanical seismic sensor system (OMS) according to claim 1, wherein frame (K) equipped with at least one means of firm attachment to at least one of: the ground and or of a firm but disconnectable connection with rigid undeformable support (P).

6. The optomechanical seismic sensor system (OMS) according to claim 1, further comprising a rigid undeformable support (P) that is firmly attachable to the ground, wherein the frame (K) and the support (P) are equipped with mutually complementary fixation elements and at least one means (S) for a firm but disconnectable coupling of the frame (K) to the support (P).

7. A method of seismic measurement using the optomechanical seismic sensor system (OMS) according to claim 1 for simultaneous measurement of translational, rotational and strain components of seismic movements at one measurement point.

8. The method of seismic measurement according to claim 7, wherein the method comprises a process of calibration of seismic sensors.

9. The method of seismic measurement according to claim 8, wherein the calibration process is performed by using the turning of the frame (K) and/or by exploiting the rigidity of the frame (K).

10. The method of seismic measurement according to claim 8, wherein the calibration process comprises steps
   (a) the frame (K) of central part (R) of system (OMS) is placed on a rigid support (P) firmly anchored to the ground, a repeatable source of seismic pulses, preferably a generator of rotational seismic pulses, is placed within a suitable distance from system (OMS) and excites at least one source pulse,
   (b) the frame (K) turns against the support (P) by a defined angle so that the same configuration of the central part (R) against the location of the source of seismic pulses is achieved, only the sensors (Gh, Gv) have moved to the next position, and then at least one source pulse is again excited,
   (c) the procedure of the point (b) is repeated for all positions, whereby each sensor (Gh, Gv) moves along a circle until it reaches its starting position,
   (d) the correct value of rotation corresponding to the given continuously repeating source signal is obtained through an arithmetic average of the measured rotations at all positions and for all source pulses, and the characteristics of the particular sensors (Gh, Gv) are corrected so that they provide this correct rotation at each position during the turning.

11. The optomechanical seismic sensor system (OMS) according to claim 1, wherein the angle formed by the lines connecting the vertical sensors (Gv) in the different pairs of vertical sensors (Gv) is identical with the angle formed by directions perpendicular to the axes of horizontal sensors (Gh) in the different pairs of horizontal sensors (Gh).

12. The optomechanical seismic sensor system (OMS) according to claim 1, wherein the angle formed by directions perpendicular to the axes of horizontal sensors (Gh) in the different pairs of horizontal sensors (Gh) is 90°.

* * * * *